(12) United States Patent
Kiefer et al.

(10) Patent No.: US 7,853,482 B2
(45) Date of Patent: Dec. 14, 2010

(54) COMPLEX PRICES IN BIDDING

(75) Inventors: Stefan Kiefer, Burrweller (DE);
Antonia Gross, Leimen (DE); Andreas Koenig, Wiesloch (DE); Michael Buehler, Wieloch (DE)

(73) Assignee: SAP Aktiengesellschaft, Walldorf (DE)

( * ) Notice: Subject to any disclaimer, the term of this patent is extended or adjusted under 35 U.S.C. 154(b) by 541 days.

(21) Appl. No.: 10/695,621

(22) Filed: Oct. 28, 2003

(65) Prior Publication Data

US 2005/0091122 A1 Apr. 28, 2005

(51) Int. Cl.
*G06F 30/00* (2006.01)
(52) U.S. Cl. .......................................... 705/26; 705/27
(58) Field of Classification Search .................. 705/26, 705/27
See application file for complete search history.

(56) References Cited

U.S. PATENT DOCUMENTS

| | | | |
|---|---|---|---|
| 5,606,602 A | 2/1997 | Johnson et al. | |
| 5,905,974 A | 5/1999 | Fraser et al. | |
| 5,905,975 A | 5/1999 | Ausubel | |
| 6,199,050 B1 | 3/2001 | Alaia et al. | |
| 6,408,283 B1 | 6/2002 | Alaia et al. | |
| 6,499,018 B1 | 12/2002 | Alaia et al. | |
| 6,564,192 B1 | 5/2003 | Kinney, Jr. et al. | |
| 7,062,460 B1 * | 6/2006 | Growney et al. | 705/37 |
| 7,124,099 B2 * | 10/2006 | Mesaros | 705/26 |
| 7,349,879 B2 * | 3/2008 | Alsberg et al. | 705/37 |
| 7,660,741 B2 * | 2/2010 | Tenorio | 705/26 |
| 2003/0191672 A1 * | 10/2003 | Kendall et al. | 705/4 |
| 2004/0117290 A1 * | 6/2004 | Shacham | 705/37 |
| 2004/0267676 A1 * | 12/2004 | Feng et al. | 705/400 |
| 2005/0091143 A1 * | 4/2005 | Schmidt et al. | 705/37 |
| 2006/0149653 A1 * | 7/2006 | Davis et al. | 705/37 |

OTHER PUBLICATIONS

Sap Library, Sap bidding engine, http://help.sap.com/saphelp_srmsce20/helpdata/en/61/c3833cfa3dbce10000000a114027/..., printed Mar. 12, 2004, no publication date availble.*

Sap Library, Processing bid invitations/reverse auctions, http://help.sap.com/saphelp_crm30/helpdata/en/5a/4cc5376848616ae10000009b38f889/co..., printed Mar. 12, 2004, no publication date availble.*

Knight, Fred, The half-full cup, Business communications review, Jun. 2004.*

Foust, Brook, E-procurement apps hook onto the supply chain, Informationweek, dated Mar. 2002.*

* cited by examiner

*Primary Examiner*—Mark Fadok
(74) *Attorney, Agent, or Firm*—Fish & Richardson P.C.

(57) ABSTRACT

Managing bid pricing information comprises receiving transaction information and item data from a buyer, generating a bid invitation containing entries relating to the transaction information and item data, and making the bid invitation available to a plurality of potential bidders, receiving from one or more of the potential bidders bid invitations containing a complex pricing structure and corresponding complex pricing amounts, and selecting a winning bidder based on the complex pricing amounts.

15 Claims, 10 Drawing Sheets

Display Bid

[Submit Bid] [Hold Bid] [Check Bid] [Refresh] [Download to Excel]

Check the data and information for your bid. You can also add your own notes.

Basic Data | Partner/Lieferadresse | Info for Purchaser | My Notes

| | |
|---|---|
| Name des Angebotes | Contract: Monitors July to december 2005 |
| Nummer des Angebotes | 1031 |
| Bid submission deadline | 31.05.2005 00:00:00 |
| Time zone | CET |
| Binding period | 31.12.2005 |
| Bid status | Created |
| Opening date | |
| FARBE | |
| Angelegt von | Annette1 Bidder1000-1 |
| Zuletzt bearbeitet von | Annette1 Bidder1000-1 am 12.03.2003 |

Enter quantities and prices:

Item Overview

| Description | Lieferantenproduktnummer | Qty | Unit | Preis | pro | Deliv.date | Actions |
|---|---|---|---|---|---|---|---|
| Monitors 17" | | 100 | Piece 120, 00 | EUR 1 | Piece | | |
| Monitors 19" | | 50 | Piece 180, 00 | EUR 1 | Piece | | |

COMPLEX PRICES IN BIDDING

BACKGROUND

This invention relates to automated contracting systems, and more particularly to systems and methods for permitting the use of complex pricing scenarios in computer-controlled bidding systems and processes wherein bidders may enter their prices directly into the buying system.

Businesses are not in business to make agreements. Rather, they are in business to make products, provide advice and services, and help people. Agreements, typically in the form of contracts, are simply a necessary part of doing business. But agreements generally cost money, time, and other resources because they require negotiation, revision, formalizing, and execution. All of these costs interfere with the ability to conduct business efficiently.

Traditional contracts are also relatively inflexible means by which to reach an agreement. Generally a contract covers a defined time period, such as a year, and thus must be drafted generally enough to cover unforeseen circumstances that might occur during the contract period. Flexibility in a contract generally requires generality in its terms, which tends to make the contract vague. In addition, buyers spend an inordinate amount of time on the agreement process.

Also, while it is possible in a contract that is negotiated face-to-face over a long period to have complex pricing schemes, such contracts are expensive to negotiate and thus are only appropriate for contracts that cover very large projects. On the other end, certain contracts can be assembled very easily. The most common example is the adhesion contract, whereby one party picks the terms, and provides them to the other party on a take-it-or-leave-it basis. For example, the terms may be listed on the back of an order form or an invoice. Such a system is simple and easy to administer. There is no negotiating and essentially no flexibility. Adhesion contracts are typically used in retail establishments and for some automated transactions, for example, with "click wrap" agreements. Because there is no negotiating, the subtleties of human behavior play little or no role, and such transactions can be automated very easily.

Other automated contracting schemes provide more flexibility, such as by opening a bidding situation in which various bidders can provide an offered price or other terms, and the buyer can select one of the bidders. This approach, although more flexible than an adhesion contract, still lacks for flexibility offered to the contracting parties.

Thus, there is a need for a system and method that provides for automated control of bidding and permits the buyer to receive flexible and complex pricing schemes from the bidders.

SUMMARY

This document discloses a method and system that assists in managing bidding processes for contracts having complex pricing information. In one aspect, a system for managing bidding is disclosed. The system comprises pricing storage that maintains information relating to pricing structures and pricing amounts, a bid invitation generator associated with a buyer and adapted to present information relating to a buyer requirement for review by a plurality of potential bidders, an interface that provides the information relating to a buyer requirement to the plurality of potential bidders in the form of a bid invitation, and a contract engine responsive to bids submitted by one or more bidders and configured to receive a bid comprising a pricing structure and pricing amounts from a first bidder, and to make available the pricing structure for review by other potential bidders. The contract engine may be configured to make the pricing amounts from the first bidder available for review by other potential bidders. Also, provision may be made for a bid aggregator adapted to generate a summary of pricing terms from bids received from among the plurality of potential bidders. The bid aggregator may be configured to score the bids according to a predetermined scoring standard, and the highest scoring bidder may be selected as a winning bidder.

In certain embodiments, the contract engine is configured to form a contract including pricing information related to pricing structure and pricing amounts submitted by a winning bidder. In addition, the interface may supervise contracting workflow to allow for approval of the contract. Also, the pricing structure may comprise location-specific pricing information, or date-based pricing information.

In another aspect, a computer-implemented system is disclosed and comprises pricing storage that maintains information relating to pricing structures and pricing amounts, a bid invitation generator associated with a buyer and adapted to present information relating to a buyer requirement for review by a plurality of potential bidders, an interface that provides the information relating to a buyer requirement to the plurality of potential bidders in the form of a bid invitation, and a contract engine responsive to bids submitted by one or more bidders and configured to receive a bid comprising a pricing structure and pricing amounts from a first bidder. The pricing structure may comprise location-specific pricing information and date-based pricing information.

In yet another aspect, a computer-implemented method of managing bid pricing information is disclosed. The method comprises receiving transaction information and item data from a buyer, generating a bid invitation containing entries relating to the transaction information and item data, and making the bid invitation available to a plurality of potential bidders, receiving from one or more of the potential bidders bid invitations containing a complex pricing structure and corresponding complex pricing amounts, and selecting a winning bidder based on the complex pricing amounts. A complex pricing structure from a first bidder may be made available for review by other potential bidders, and complex pricing amounts from the first bidder may also be made available for review by other potential bidders. A summary of pricing terms may also be generated from bids received from among the plurality of potential bidders.

In some embodiments, the bids may be scored according to a predetermined scoring standard, and a winning bidder may be selected from the highest scoring bidder. A contract may also be formed and may include pricing information related to pricing structure and pricing amounts submitted by the winning bidder. The complex pricing structure may include location-specific pricing information or date-specific pricing information.

Advantageously, the method and system may provide effective automation for the bidding process so that more flexible contracts may be entered into without much additional effort on the part of the contracting parties.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 7 is a screen shot of a display of terms that are shown to a potential bidder.

FIG. 9 is a screen shot showing general contract information to enable verification of the information.

FIG. 10 is a screen shot showing specific contract information to enable verification of the information.

Like reference symbols in the various drawings indicate like elements.

DETAILED DESCRIPTION

Figure 1:
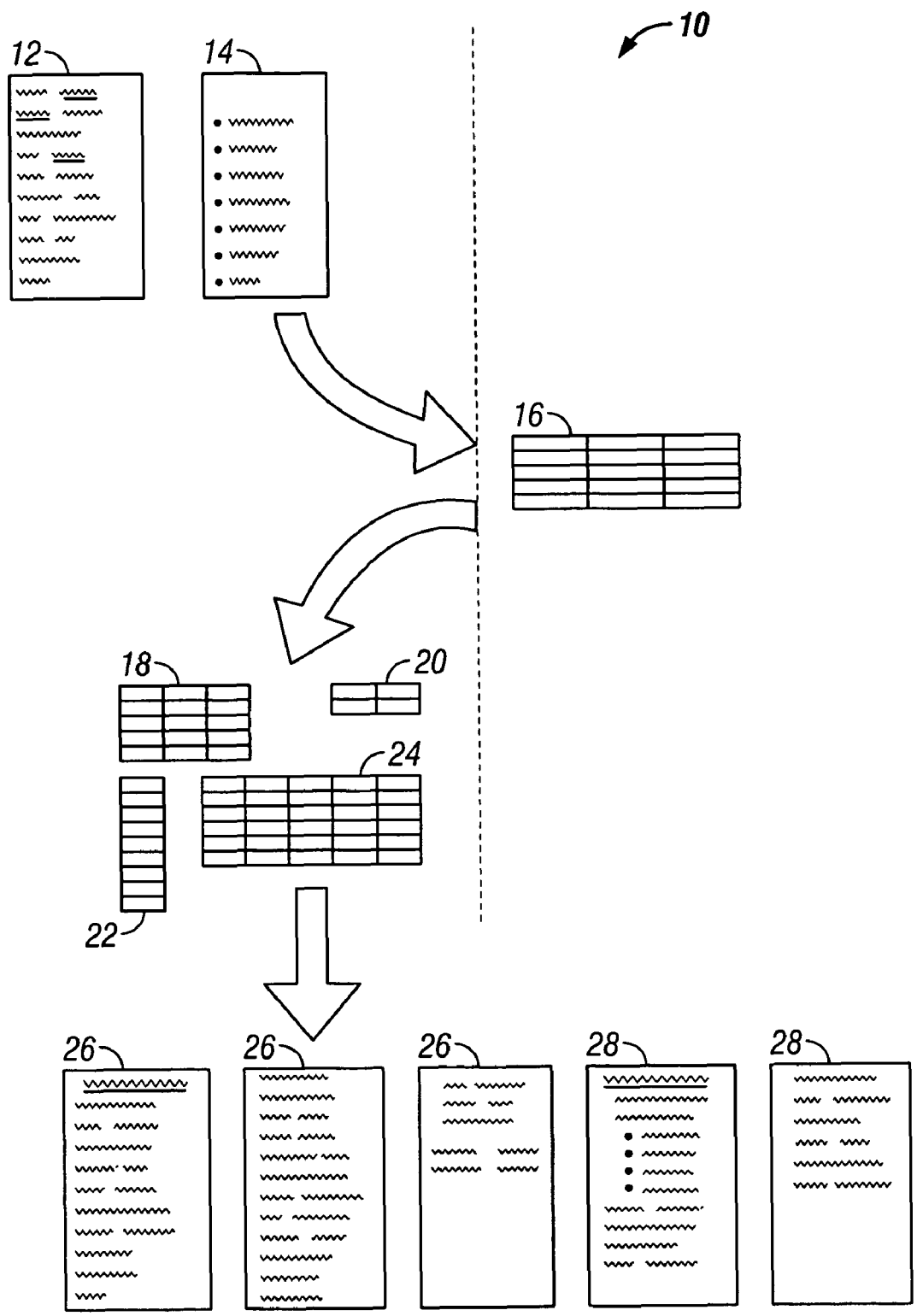
FIG. 1 is a schematic diagram showing the operation of a bidding process in accordance with the present invention.

FIG. 1 is a schematic diagram showing the operation of a bidding process 10 in accordance with the present invention. In general, process 10 comprises the formation and provision of a bid invitation by a buyer, the submission of bids with varying complex pricing scenarios by a plurality of bidders, the selection of a winning bidder, and the provision of contract documents associated with the winning bid. Contracting information may be represented, for example, by form contract 12 or term sheet 14. Form contract 12 may be a document or a collection of documents or other pieces of information containing general information that generally does not change from one contract to the next (shown in FIG. 1 as squiggly lines), and specific information that changes with the terms of each contract (shown in straight lines). The specific information could include, for example, contracting parties, delivery schedules, expected quantities, and various pricing schemes. Term sheet 14 may simply be any simplified characterization of the information provided in form contract 12, and may include a sequential listing of contract terms and provisions. The information may also be stored or displayed in any other appropriate manner, such as in fields of a relational database with display in a partially completed on-screen form. In addition, not all contract information needs to be stored in one location, document, or database.

The form contract 12 or term sheet 14 information may be adjusted or supplemented to produce a bid invitation that may be sent to potential bidders on a project. The bidders may be in an organization that differs from that in which the buyer of a product or service is located, as shown by the dashed vertical line. The bid invitation may include information concerning the products or services sought to be procured, and the expected required quantity of each. The bid invitation may be managed according to well-known supplier relationship management (SRM) techniques.

The bidders may each be given the option to submit bids according to their own desired structure. For instance, a bidder can be provided with multiple options for certain provisions in a supply agreement, such as options to use various shippers having different costs and different service levels. Each bidder may select a particular shipper that the bidder believes will give it the highest chance of winning the bid, when that information is balanced against other terms submitted by the bidder, such as price. More centrally, each bidder may formulate their own complex pricing scenario 16 for a bid and submit it in a preferred manner. In this manner, the buyer need not concern itself with maintenance of complex pricing scenarios, which can be inconvenient in some situations.

The complex pricing structures may take a number of different forms. For example, scales may be specified based on quantity delivered or on value delivered. Specifically, the bidder may offer a 5% discount on quantities up to 1000 pieces, and a 10% discount on quantities over 1000 pieces where the 5% and 10% figures are pricing values associated with the pricing structure. The bidder may be allowed to specify the number of discount ranges and their endpoints, along with the discount values. The bidder can also enter location-specific pricing information. This means that deliveries to one location will have a price that is different than deliveries to another location. Date-based pricing may also be provided by a bidder. For example, a bidder can offer one price or set of prices for the first three months of an agreement, and a different price or set of prices for subsequent three-month periods. In this manner, the bidder can maintain future effective dates that are automatically considered in purchasing transactions.

Pricing bids may be submitted by multiple bidders, having various pricing structures 18, 20, 22, 24. As represented schematically by tables having varying dimensions, pricing structure 18 may have three pricing terms and five pricing entries. Each pricing entry could represent, for example, a particular time period within the term of a contract, or particular supply levels where higher levels can be obtained at lower prices.

Alternatively, the complex pricing structures 18, 20, 22, 24 may be a common scenario that is shared by multiple different bidders. For example, multiple complex scenarios could be presented to bidders, either by the buyer, by a third-party, or by one of the bidders. For example, the buyers system, upon receiving a complex bid from one bidder may post the pricing structure of the bid (but may hide the values of the bid) to make it available to other bidders so that they can more closely match their bids with the bids of other bidders. Bidders may also be notified about a new pricing structure so that they can match its format with their own bids. Information regarding values of the bids may also be displayed, or information relating to the values of the bids may be displayed. For example, the system may hide actual bid values, but may inform a bidder of the bidder's pricing rank from among the various bidders.

With the complex pricing structures 18, 20, 22, 24, and when the bidding period has closed, the buyer's system may aggregate all of the various bids so that they can be more easily compared. With respect to pricing, the various bids may be normalized so as to permit side-by-side comparison, and pricing may be graphed across the broad range of values for different levels of demand. In addition, selection criteria for selecting one pricing scenario over another may be formulated, and those criteria may be used by the system to select a "best" price bid automatically. The desirability of a particular bidder's pricing may also be compared with other bid terms provided by particular bidders in deciding which bidder to select in moving forward.

With a particular bidder selected, the buyer's system may then generate the necessary contract documents to carry forward with the agreement. As shown, the documents include contract 26 and attachment 28. Contract 26 may be formed by combining general information from form contract 12 and specific information received from the winning bidder, including complex pricing structure 16 and its associated pricing values. The complex pricing scenario may be interpreted into textual contract provisions by the buyer's system, or the scenario may be represented in contract 26 in the same manner it was represented in the bidders bid. The attachments 28 may be any traditional contract attachment, such as product specifications or other similar instructions.

Figure 2:
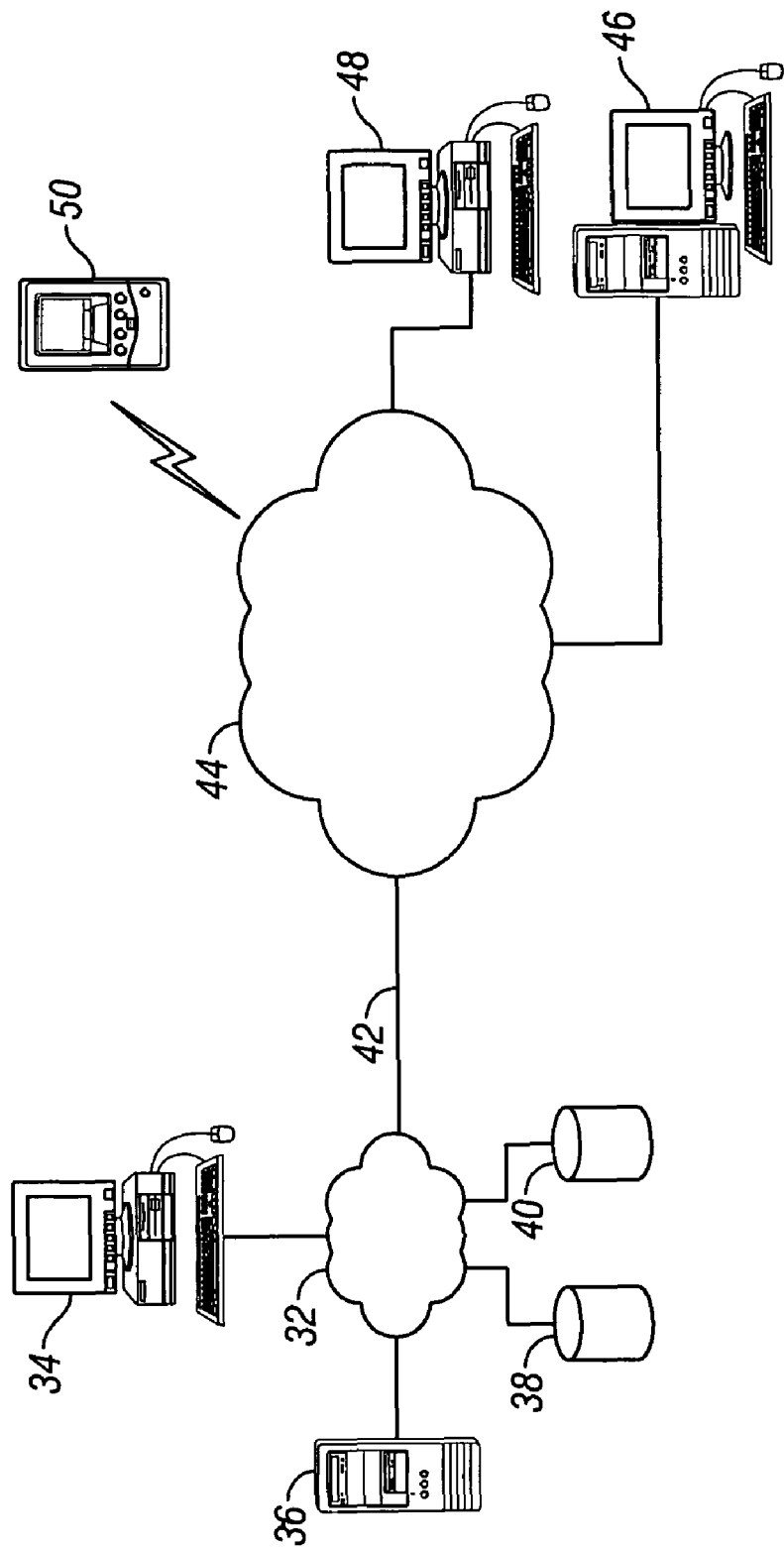
FIG. 2 is a schematic diagram of a system capable of carrying out a bidding process.

FIG. 2 is a schematic diagram of a system 30 capable of carrying out a bidding process. The system 30 may be managed by a member of an organization, such as a procurement officer, who accesses system 30 via terminal 34, which may be any appropriate mechanism to access system 30, such as a web-browser equipped personal computer, a personal digital assistant, or other device. Terminal 34 may connect to network 32, which may be a local area network (LAN) or wide area network (WAN) operating within a particular organization, such as over an intranet or portal system. In this manner, terminal 34 may have access to contract information stored in structured database 38 and unstructured database 40. Structured database 38 may include, for example, one or more relational databases that reflect quantities of goods purchased by the organization and prices paid for those goods, and may be, for example, an SAP data warehouse. System 30 may supply values for entries in structured database 38, such as by inserting a contracted-for amount as a cost of goods entry. Such an entry may then be used by other components in communication with network 32, such as other components of a enterprise resource planning (ERP) system. System 30 may also read entries out of structured database 38, such as to determine the number of a particular item in inventory and the demand for that item over time. Unstructured database 40 may include items, such as documents and digitized audio and video files, that do not fit easily into a structured database, and may be, for example, an SAP knowledge management (KM) database.

Information relating to the system may be delivered by web application server (WAS) 36, including over link 42 to the Internet 44. In this manner, users such as bidders external to the organization may communicate with the user at terminal 34 and may access bid invitations and other necessary contracting information. For example, terminals 46, 48 may have e-mail access or may contain web-enabled browsers that allow users to access bid invitations and respond to them electronically. Other devices, such as a wireless personal digital assistant 50, may also communicate with WAS 36.

As will be understood, system 30 is simply an example of one form by which access may be provided to a system for managing contract information and formation. Many other configurations are readily possible.

Figure 3:
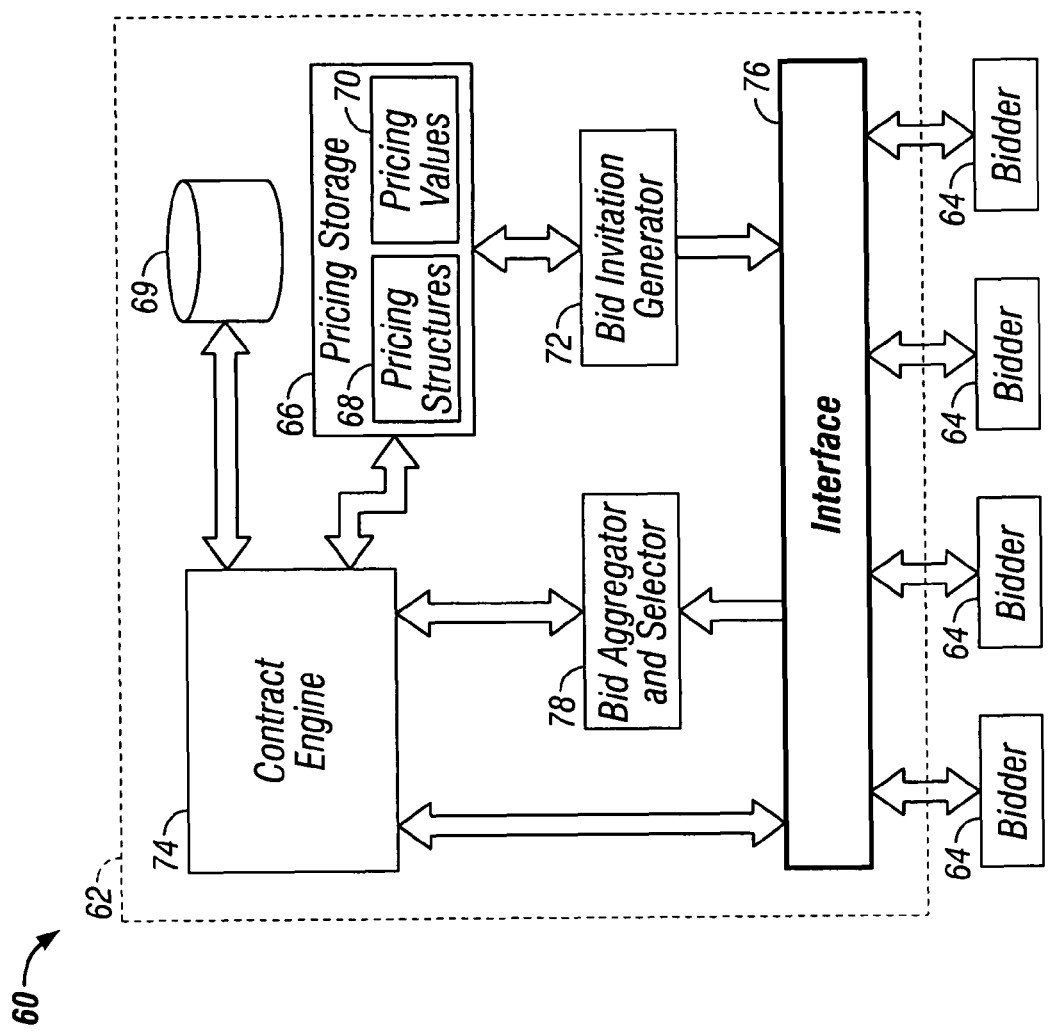
FIG. 3 is a block diagram of a system for managing a bidding process including complex pricing scenarios.

FIG. 3 is a block diagram of a system 60 for managing a bidding process. The system 60 is comprised of elements controlled within one organization, indicated by dashed box 62, which communicates with various bidders 64 through interface 76. Interface 76 may be any appropriate mechanism or mechanisms for communication, such as e-mail, XML messages, various standards for web page interaction, facsimile, or other means.

Pricing information is accessible from storage 66, both as pricing structures 68 and pricing values 70. Pricing structures 68 may be any appropriate arrangement by which a complex pricing scenario may be represented, but without particular pricing values. For example, such a scenario could included pricing break-outs for various levels of demand or for each of various time periods during the term of the contract. Pricing values 70 may be actual agreed-upon prices for various transactions, and may include multiple related prices arranged in a complex pricing structure.

Bid invitation generator 72 may draw upon the pricing structures 68 and pricing values 70 in storage 66 to produce a bid invitation to be sent out to bidders for a contract, either for a new contract or a subsequent contract that is replacing a previous contract about to expire. Bid invitation generator 72 may, for example, access the prior contract, obtain from it the information relating to pricing structure, and generate bid terms, along with other information that may be provided by the system 60. Alternatively, the bid invitation generator 72 may leave the pricing term entirely open, and allow bidders to present various complex pricing structures.

Bid invitation generator 72 may also incorporate information generated by a user during performance of the prior contract. For example, where difficulties arose with the pricing of a prior contract, the user may have indicated such difficulties to the system, and provided notes regarding those difficulties. Thus, the bid invitation generator 72 may present the user with those notes before the bid invitations are transmitted. Also, the user may have had the opportunity, when those earlier problems arose, to select from among alternative available pricing structures, and the selected structures could be inserted in the bid invitations and also used in the subsequent contract. With this feature, the user may be able to address and correct problems from the prior contract without having to catalogue and remember them at the time of contract renewal.

Bid invitation generator 72 may pass information received from storage 66 on as part of the bid invitation and may alternatively, or in addition, convert the information to a format appropriate for a bid invitation. For example, the verbiage of a contract may be replaced with a more compact term sheet that provides summaries of the relevant provisions. In addition, access to the bid invitation may be provided to contract engine 74, which may comprise an automated application or simply an editor made available to a user through a computer terminal. Thus, once a preliminary bid invitation has been generated, the contract engine 74 may provide a user with the opportunity to review the preliminary invitation and make changes to it. For example, a purchasing agent may prefer to review the prior contract and any other information relating to the performance of that contract before sending out a new bid invitation. Specifically, the agent may change the identification or specification for items to be provided under the contract if members of the organization expressed dissatisfaction with the items supplied under the prior contract. The agent may also select a different pricing structure for the bid invitation, such as when the currently-selected pricing structure has proved to be unsatisfactory.

The bid invitation may be generated so as to create multiple options for certain terms or provisions. For example, bidders may be provided with several options by which they can choose to ship products under the contract, wherein some options are more expensive than others. The bidders may then select one of the options with the understanding that it might help or hurt their chance of winning the bid. The buyer may institute bid evaluation rules to help determine the overall effect of various terms from various bidders on the quality of the bid. For example, a scoring system may be constructed by which various terms have an assigned importance relative to other terms, and the values that are bid for each term may be normalized so as to provide a convenient mechanism to evaluate the bids. For example, a bidder may be given several options for providing delivery, with the understanding that, by selecting a less expensive option, the bidder's chance of getting the contract will be hurt. In a like manner, various product specifications may be provided, and the bidder could choose the level of quality that it would like to provide. The bidders may also be made aware of the rules so that they can evaluate the various options available to them under a bid invitation.

Once a bid invitation has been fully generated, it may be made available to bidders through interface 76. Interface 76 may be any appropriate system, such as an e-mail system or a web application server. Interface 76 may allow interaction with bidders 64 using any of a number of appropriate mechanisms. Bidders to be targeted by a bid invitation may be selected by the user, or may be selected automatically such as by accessing lists of possible suppliers in a particular industry. For example, if the prior contract was performed in an unsatisfactory manner, the company on that contract may be excluded from the bid list for the subsequent contract, either by the user or automatically, such as by checking a satisfaction rating associated with the bidder's performance.

Bid aggregator and selector 78 receives bids that are returned by bidders in response to the bid invitation. Important requested provisions or terms that were obtained from the various bidders may be compared by the bid aggregator and selector 78, either by placing them in a convenient format so that a user can review them, or by an automated selection process. As an example, a grid of selection criteria may be presented to a user along with the corresponding terms presented by each bidder, and the user may be allowed to select the preferred bidder, which then becomes the other party to the subsequent contract. Alternatively, the system may review the bids to determine which bids meet minimum standards, and then select the bidder from that group with the lowest price. In addition, the bid aggregator and selector 78 may initially remove any bidders that do not meet minimum bidding requirements, so that such bidders are not even included in the evaluation process.

Bid aggregator and selector 78 may in particular provide for analysis of the pricing terms of a bid. For example, criteria or methods may be pre-established to allow the system to summarize, compare, and review differences between the various submitted bids. For example, the system can estimate demand over time and plug the values for the demand complex pricing scenario received from each bidder, and then compare the costs of the various bids. The results of the comparison may be used, for example, to select the highest rated bidder, or may be displayed for a user at the buyer organization so that the user may make the decision.

Bid aggregator and selector 78 may then pass information about the winning bidder to contract engine 74. The information may include values for certain provisions in the contract (e.g., price, term, etc.), and may also include additional information provided by the winning bidder. Other information needed to complete the contract may be obtained from a variety of sources. For example, the basic language for the contract may be accessed from storage 66. The contract engine 74 may obtain an identifying number for the bid and may use that number to access the appropriate information from storage 66.

The contract engine 74 then aggregates the appropriate information from contract storage 66, and obtains the remaining information from the winning bidder via bid aggregator and selector 78. Additional data can be accessed from database 69 or from other data storage sources, for example, data relating to other contracts between the parties, detail information about the goods, and other information required to produce a complete contract that is ready for execution. In this manner, detailed pricing information can be entered from the bidder side into the computer system on the buyer's side, and the buyer's system can use the structured pricing information to create follow-on documents like contracts or purchase orders so as to save money for the buyer.

Figure 4:
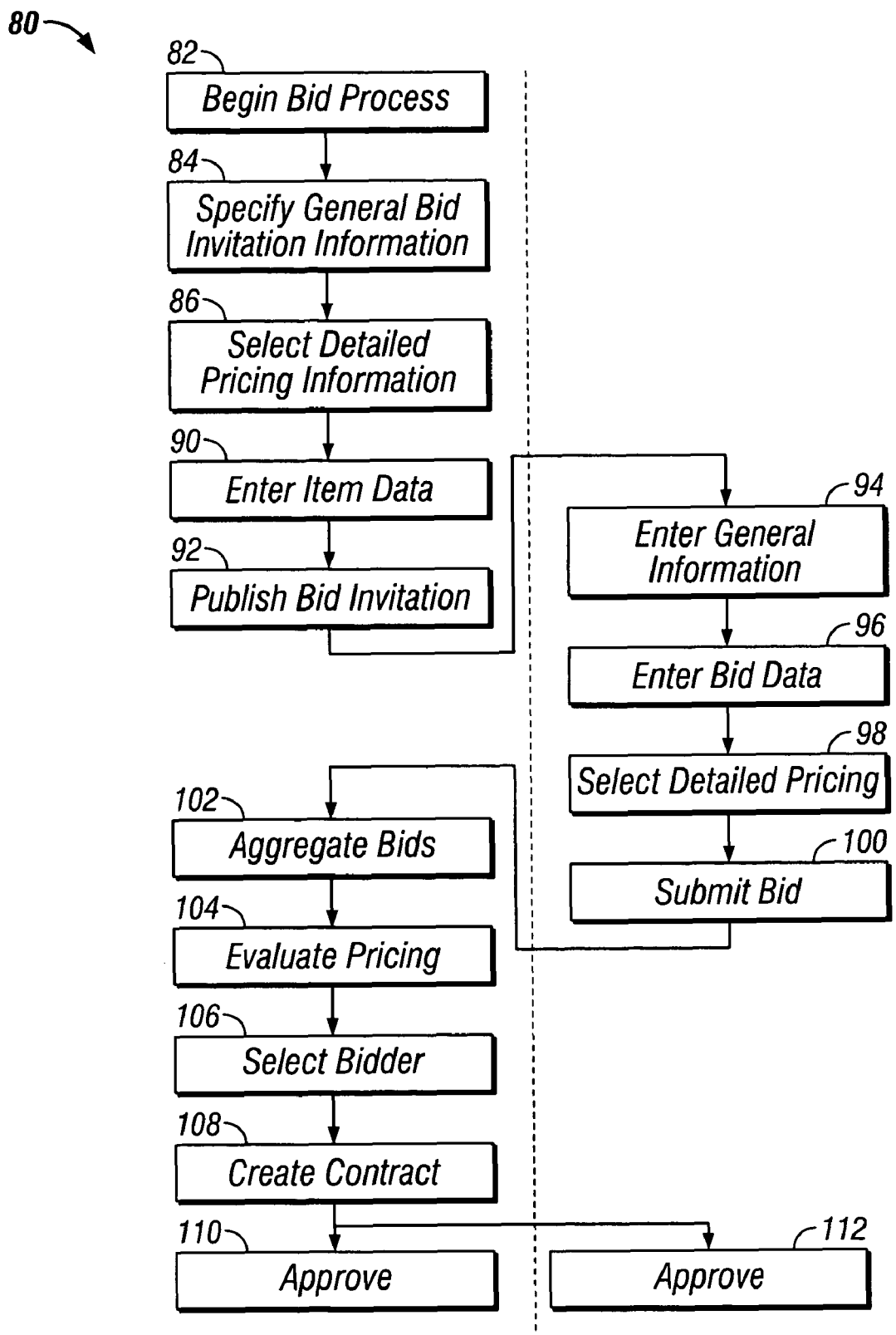
FIG. 4 is a flow chart showing the interaction of a buyer and bidders in a bidding process involving complex pricing.

FIG. 4 is a flow chart showing the interaction of a buyer and bidders in a bidding process involving complex pricing. In general, the process may allow bidders to propose complex pricing schemes (such as scales, discounts, and location-specific pricing).

A buyer, such as a purchasing agent, may initially start the bidding process (box 82) when it is desired to acquire particular goods or services, or when a previous contract is about to expire and needs to be replaced with a new contract. The buyer may specify general bid invitation information (box 84) for the bidding process. Specifically, the buyer can identify a transaction type, a bid invitation name (and receive a corresponding bid invitation number), a responsible purchasing organization, start and stop dates for the bidding period, currency for the transaction, and types of products or services to be covered by the bidding. The buyer may also be given the option to select detailed pricing information (box 86) so that bidders are given the chance to provide their pricing as complex pricing schemes. After the buyer is given an opportunity to check and edit the remaining information, the buyer may select to publish the bid invitation (box 92). The invitation may be published by making it available to the public, or it may be targeted at particular potential bidders, such as by sending them an e-mail containing the bid information or a hyperlink in an e-mail that will take them to the bid information at a hosted web site.

The bidders may then be given the opportunity, if they choose, to submit information in the form of a bid. First, they may enter general information, such as identifying information or account information (box 94). This step may be unnecessary where there is a preexisting relationship between the buyer and the bidder, or where the buyer otherwise has appropriate information concerning the bidder. After the bidder has had a chance to review the bid invitation, it may then enter data relating to the bid (box 96). This information may include descriptions of the goods or services to be supplied, and other information that the buyer may use to evaluate the suitability of the bid as compared to other bids. In addition, the bidder may enter pricing information for the bid. The pricing information may be simply, for example, involving a simple per unit price for each item in the bid invitation.

Alternatively, the bidder may choose to submit a complex pricing scenario, as described above (box 98). The system may provide the bidder with instructions for forming a complex pricing proposal. In addition, the system may provide the bidder with examples of general complex pricing schemes, and may even allow the bidder to select a particular complex pricing structure. For instance, the system may present, along with other possible pricing structures, a pricing structure that allows for a particular price for each of several quantity levels or each of several time periods. For example, the system may be configured to divide the expected demand quantity into a plurality of groups, and present the bidder with a table have the quantity ranges in one column and empty bid amounts in a second column. The bidder may then be enabled to enter particular prices into each of the cells in the second column. The bidder may also choose from a different complex pricing scenario that is made available. Also, the buyer may have previously selected possible alternative complex pricing structures to be made available to the bidders. In this manner, bidders may be given the flexibility to choose a pricing structure that relates well to their own business and pricing structures.

Once the bidder has determined that it has entered the appropriate information for its bid, it may submit the bid (box 100). The buyer's system may then or at a later time evaluate the bid to determine that it is complete. If necessary information is missing from the bid, the buyer's system may notify the bidder that additional information is required, or may simply reject the bid.

The buyer's system may also provide visibility of the bid to other bidders. For example, the entire bid may be made available to other bidders so that they can make or adjust their own bids accordingly. Also, the identity of the bidder could be made available to the other bidders. This would essentially create an open auction system having complex pricing scenarios. Alternatively, limited information about the bid may be made available. For example, other bidders might be notified only of the pricing amounts and the pricing structure, but not of the bidder's identity. The other bidders could also be notified about the pricing structure, but not the pricing amounts. In this manner, the other bidders could be able to submit bids that could be compared more easily side-by-side with the first bidder's submission, but without knowledge of what the first bidder has bid. In another situation, the various bidders could be provided only with an indication of where they sit compared to other bidders. For example, their rank within the pricing scheme could be provided, or their approximate rank (such as by using a quartile system) could be given, or the fact that they are not currently the lowest bidder could also be given. The bidders could use this information, combined with their knowledge of the non-pricing components of their bid, to adjust their bid to be more competitive.

At the expiration of the bidding period, the buyer's system may then aggregate the various bids (box 102) to assist in the comparison of bids. For example, the system could provide pricing information in one or more tables or in one or more graphs (such as cost vs. quantity on a line graph) to allow for simple side-by-side comparisons. The user or an automated system may then make a qualified comparison of the various bids to select a "best" bid (box 104). For instance, expected demand values could be input into each of the complex pricing submissions to determine what expected total cost will be so as to determine a "best" priced bid. The system may then determine which of the various bids meet minimum requirements for other bid factors, and select the winning bidder as the lowest priced bid from among those that meet the minimum requirements (box 106).

With a bidder selected, the contract may then be created (box 108). The complex pricing information may be inserted into the contract, either in the form in which it was submitted (e.g., in table form) or in another appropriate form. The specific bidding information received from the winning bidder may also be combined with the general contract information selected by the buyer, and may be modified as required, such as by replacing certain provisions with corresponding provisions that have been previously agreed upon between the parties. For example, a generic warranty provision may be replaced with a more specific warranty provision to which the parties have previously agreed. The buyer may then review the draft contract and submit it for approval (boxes 110, 112). The approval may involve a workflow whereby approving authorities at the buyer organization check off on the contract before it is released to the winning bidder. Alternatively, the approval may be bilateral, so that the buyer and the winning bidder can collaboratively mark up the contract until a satisfactory contract exists. The contract may then be executed by any appropriate means, such as by actual signature or digital signature.

Figure 5:
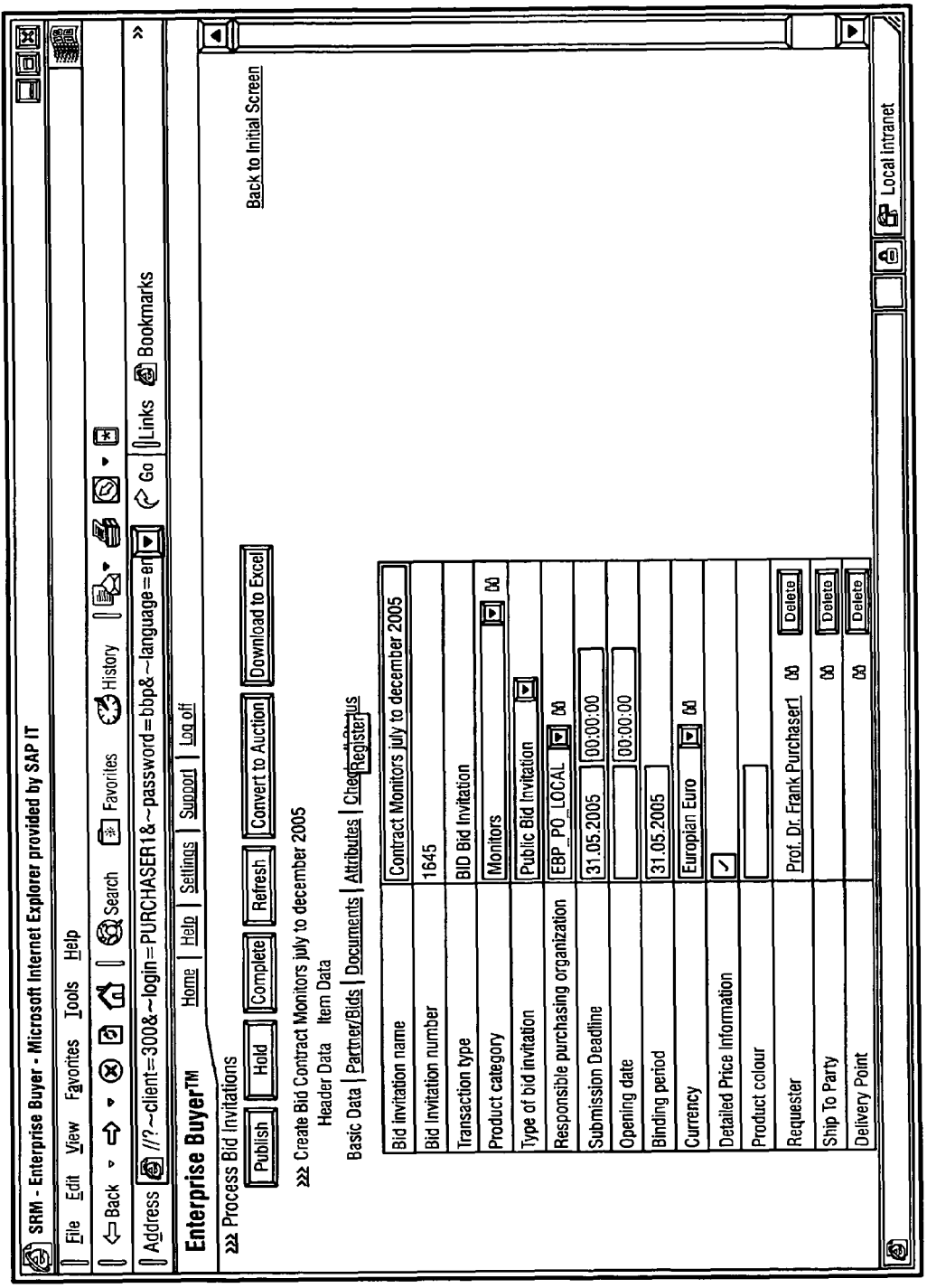
FIG. 5 is a screen shot of a display for building a bid invitation.

FIG. 5 is a screen shot of a display for building a bid invitation. The display shows general header data for a bidding and contracting process. For example, the buyer can provide a name for the bid invitation, the type of bid invitation (whether public, semi-public, or private by invitation only), the product category to be supplied in the transaction, the start and end dates for the bidding process, and the organization responsible for the purchase. Other information regarding the general provisions of the particular transaction may also be provided. The buyer may also check a box marked "Detailed Pricing Information" so that the bid invitation allows bidders to enter in complex bidding scenarios. The buyer may also be provided with options (not shown) to select one or more specific types of complex pricing scenarios, such as rebates, scales, future effective dates, and location specific pricing, to be made available as optional choices to the bidders. The display may also prompt the buyer to identify potential bidders, and specify attachments and further instructions for a contract created from the bidding process.

Figure 6:
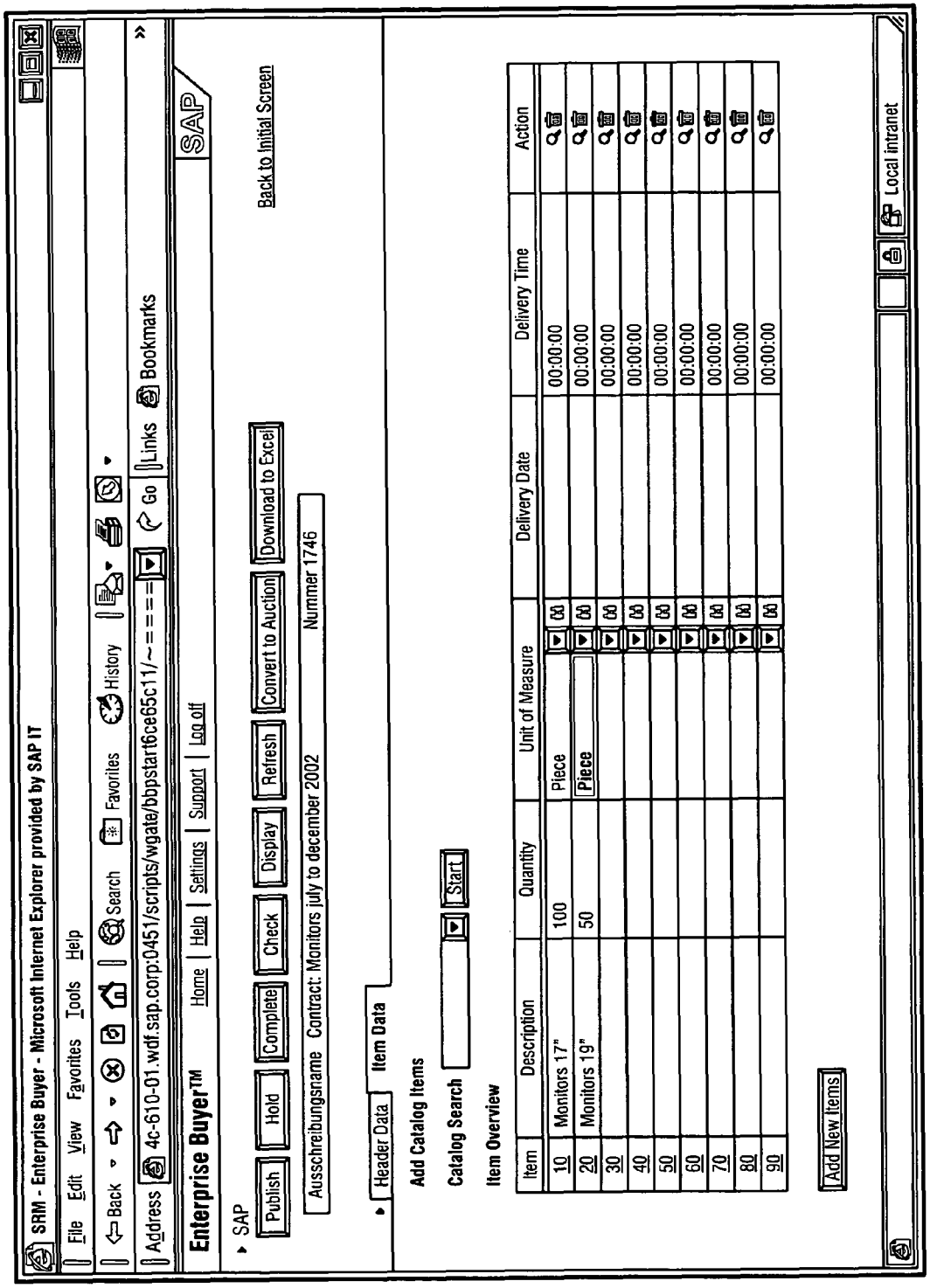
FIG. 6 is a screen shot of a display showing items to be acquired through a bidding process.

FIG. 6 is a screen shot of a display showing items to be acquired through a bidding process. Each item for the transaction is provided automatically with a unique identifying number, and the buyer may provide information relating to each product or service to be acquired as part of the bidding and contracting process. Once the buyer has entered enough item information, the buyer may then choose to have the provisions published as a bid invitation. For example, the information may be posted to a web site where potential bidders can access it. Alternatively, the information may be sent directly to prospective bidders, such as by using e-mail. The e-mail could also include a hyperlink to a web site where the information is posted, and where bidders are allowed to interact with the information to enter bidding data.

FIG. 7 is a screen shot of a display of terms that are shown to a potential bidder. These terms can include the general information provided by the buyer at the top of the display, along with item data at the bottom of the display. The bidder may choose to enter simple pricing information, e.g., by which the bidder simply provides a single price for each item. Alternatively, the user may be provided with the option to present pricing information in a complex pricing structure.

Figure 8:
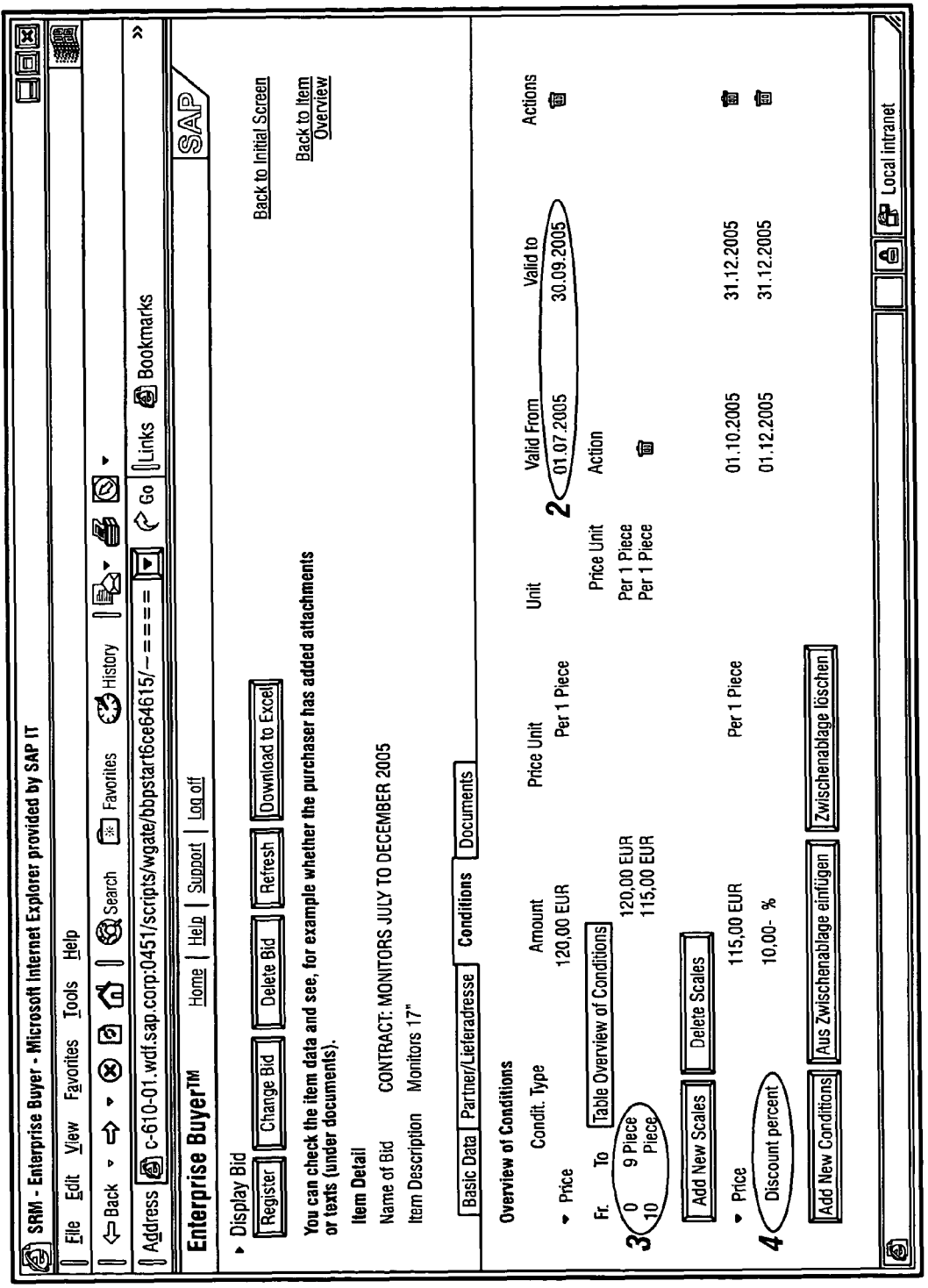
FIG. 8 is a screen shot showing detailed pricing information entered by a bidder.

FIG. 8 is a screen shot showing detailed pricing information entered by a bidder. The display focuses on a single item that is part of a transaction—here 17-inch computer monitors. In the area labeled "conditions," the bidder can enter various complex bidding information, such as a time range in which the price is effective, or multiple time ranges over which multiple prices, respectively, are effective. Also, pricing may be provided for various quantity or dollar value ranges. In addition, particular discounts may be specific for various demand levels.

Figure 9:
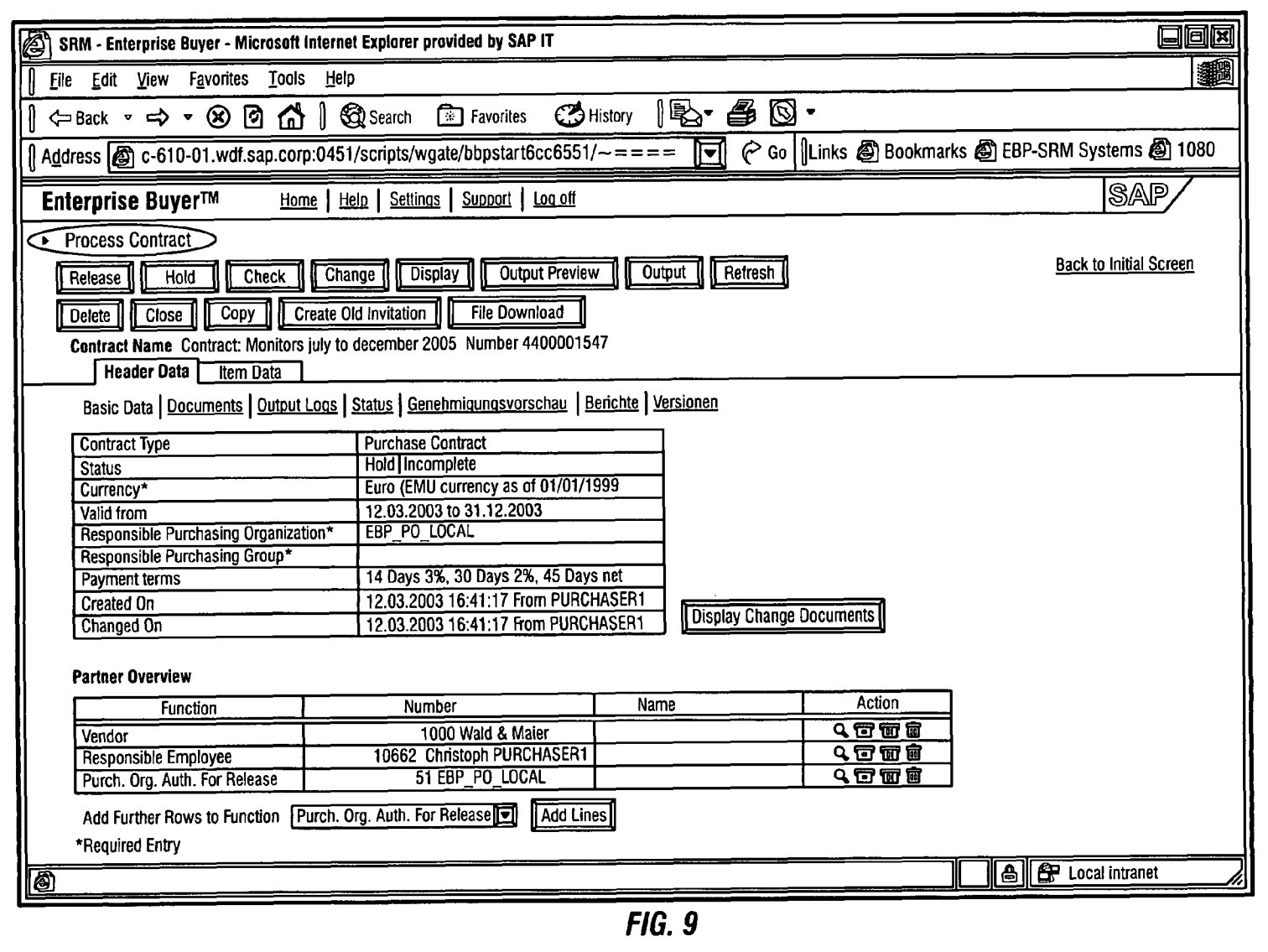

FIG. 9 is a screen shot showing general contract information to enable verification of the information. This display is generally produced after the buyer has selected a particular bidder and particular contract information has been assembled for use between the parties. The buyer may be provided with the opportunity to change various contract terms or provisions on an ad hoc basis, to form a final submitted contract that meets the buyer's needs.

Figure 10:
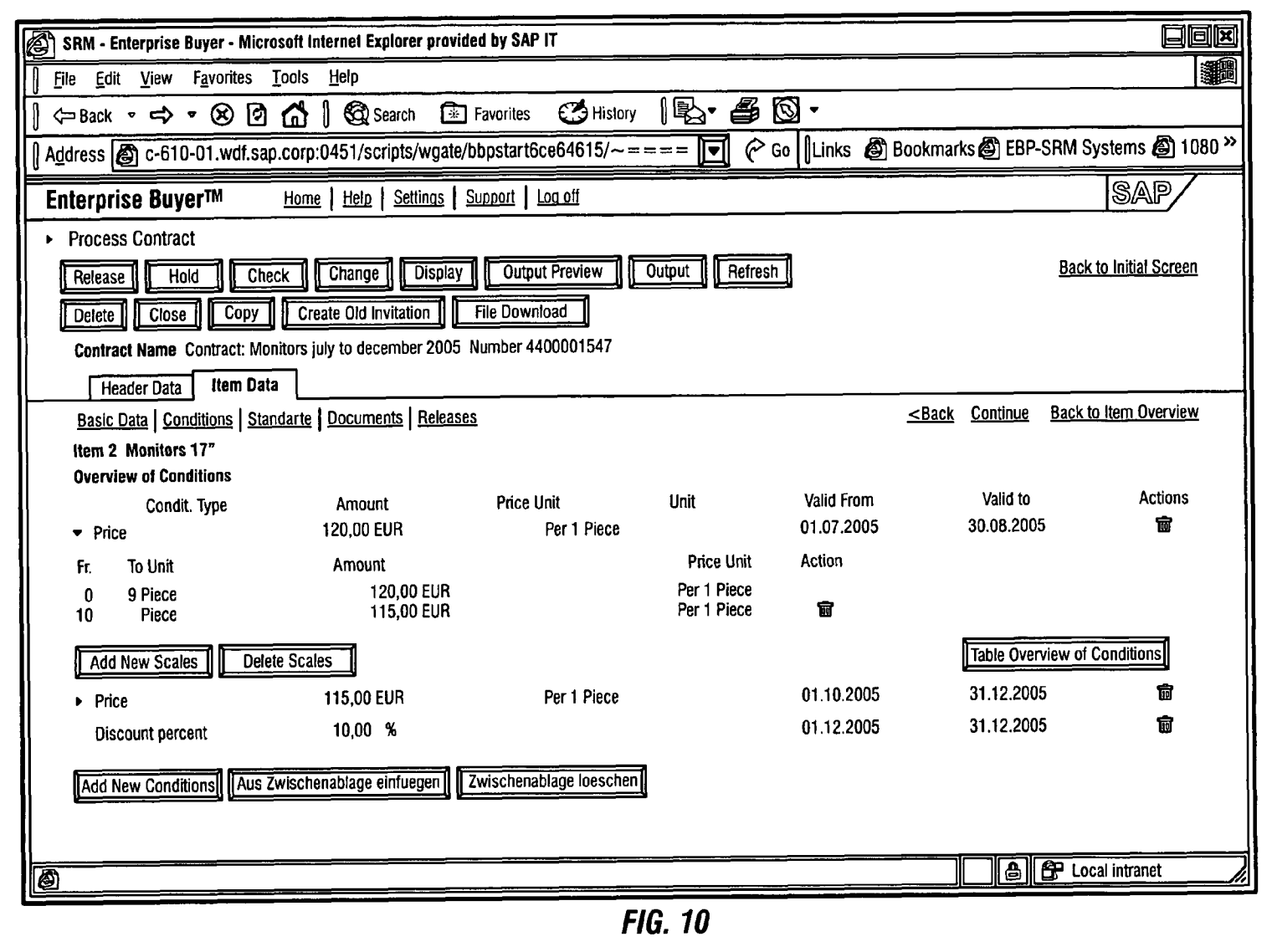

FIG. 10 is a screen shot showing specific contract information to enable verification of the information. In general, the display shows the same information that was entered by a bidder to create a complex pricing scheme. However, the information may be reformatted to enable the buyer to better evaluate the bid. For example, graphical tools may be used to chart the pricing scenario, or pricing information may be aggregated from multiple bidders and may be presented, for example, in charts or tables, to assist the buyer in determining which bid is "best" in terms of pricing.

As used herein, the terms "electronic document" and "document" mean a set of electronic data, including both electronic data stored in a file and electronic data received over a network. An electronic document does not necessarily correspond to a file. A document may be stored in a portion of a file that holds other documents, in a single file dedicated to the document in question, or in a set of coordinated files.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other. A number of embodiments of the invention have been described. Nevertheless, it will be understood that various modifications may be made without departing from the spirit and scope of the invention. For example, the various steps shown in FIG. 4 may be omitted or rearranged, and other steps may be added to the process. Also, the particular components of FIG. 3 may be supplemented and rearranged, and their functions may be combined or carried out by different components. Accordingly, other embodiments are within the scope of the following claims.

What is claimed is:

1. A computer-implemented method of managing bid pricing information, comprising:
   receiving at a computer system transaction information and item data from a buyer;
   generating with the computer system a bid invitation containing entries relating to the transaction information and item data, and making the bid invitation available to a plurality of potential bidders;
   receiving, at the computer system, from one or more of the potential bidders bid responses containing a complex pricing structure and corresponding complex pricing amounts, wherein the complex pricing structure is selected by the potential bidders from among a group of multiple pricing structures made available to the potential bidders, and
   wherein the complex pricing structure is selected and supplied by each potential bidder, and the complex pricing structures supplied by two or more potential bidders include bids with multiple different pricing amounts, and each bidder provides multiple different proposals with each proposal including a set of terms governing the proposal and a set of prices for the proposal; and
   selecting a winning bidder based at least in part on the complex pricing amounts.

2. The method of claim 1, wherein a complex pricing structure from a first bidder is made available for review by other potential bidders.

3. The method of claim 2, wherein complex pricing amounts from a first bidder are made available for review by other potential bidders.

4. The method of claim 1, further comprising generating a summary of pricing terms from bids received from among the plurality of potential bidders.

5. The method of claim 4, further comprising scoring the bids according to a predetermined scoring standard.

6. The method of claim 5, further comprising selecting the highest scoring bidder as a winning bidder.

7. The method of claim 1, further comprising forming a contract including pricing information related to pricing structure and pricing amounts submitted by a winning bidder.

8. The method of claim 1, wherein the complex pricing structure comprises location-specific pricing information.

9. The method of claim 1, wherein the complex pricing structure comprises date-based pricing information.

10. The method of claim 1, wherein the bid response from a first bidder of the plurality of bidders contains multiple bid prices for a particular item, with each bid price being associated with different terms identified and specified by the bidder.

11. The method of claim 10, further comprising providing the different bid terms from the first bidder, but not the bid prices, to the plurality of bidders other than the first bidder, and seeking bid prices from the plurality of bidders other than the first bidder for the different bid terms.

12. The method of claim 10, wherein the different terms and the bid prices correspond to geographic location-specific information.

13. The method of claim 1, wherein the multiple different pricing amounts comprise multiple prices from a particular bidder for a particular bid item.

14. The method of claim 1, further comprising aggregating bids received from the plurality of bidders when a bidding period has ended.

15. The method of claim 14, further comprising normalizing prices of the aggregated bids to permit comparison among differing bids.

* * * * *